(12) United States Patent
Brooks

(10) Patent No.: US 6,867,790 B1
(45) Date of Patent: Mar. 15, 2005

(54) METHOD AND APPARATUS TO CONDITIONALLY CONSTRAIN POINTER MOVEMENT ON A COMPUTER DISPLAY USING VISUAL CUES, CONTROLLED POINTER SPEED AND BARRIERS ON THE DISPLAY WHICH STOP OR RESTRICT POINTER MOVEMENT

(75) Inventor: Arthur Phillip Brooks, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 1149 days.

(21) Appl. No.: 08/689,526

(22) Filed: Aug. 9, 1996

(51) Int. Cl.$^7$ .............................. G09G 5/00; G09G 5/08
(52) U.S. Cl. ........................................ 345/856; 345/157
(58) Field of Search ................................ 345/145, 146, 345/157, 163, 156, 340, 326, 334, 352, 856–862

(56) References Cited

U.S. PATENT DOCUMENTS

| | | | | |
|---|---|---|---|---|
| 4,766,423 A | * | 8/1988 | Ono et al. .................. | 345/159 |
| 4,847,605 A | | 7/1989 | Callahan et al. ............. | 340/709 |
| 4,868,549 A | | 9/1989 | Affinito et al. .............. | 340/710 |
| 4,887,230 A | * | 12/1989 | Noguchi et al. ............. | 345/157 |
| 4,908,791 A | | 3/1990 | Giorgio ...................... | 364/900 |
| 4,975,690 A | | 12/1990 | Torres ........................ | 340/721 |
| 4,987,411 A | | 1/1991 | Ishigami ..................... | 340/709 |
| 5,012,231 A | * | 4/1991 | Felsenstein ................. | 345/161 |
| 5,124,689 A | | 6/1992 | Franz et al. ................. | 340/711 |
| 5,146,212 A | * | 9/1992 | Venolia ....................... | 345/145 |
| 5,162,781 A | * | 11/1992 | Cambridge .................. | 345/163 |
| 5,164,713 A | | 11/1992 | Bain ........................... | 340/710 |
| 5,179,656 A | * | 1/1993 | Lisle ........................... | 345/355 |
| 5,298,890 A | * | 3/1994 | Kanamaru et al. ........... | 345/157 |
| 5,327,528 A | * | 7/1994 | Hidaka et al. ............... | 345/433 |
| 5,392,389 A | | 2/1995 | Fleming ...................... | 395/159 |
| 5,469,191 A | * | 11/1995 | Smith, III et al. ........... | 345/157 |
| 5,508,717 A | * | 4/1996 | Miller ......................... | 345/145 |
| 5,565,888 A | * | 10/1996 | Selker ......................... | 345/146 |
| 5,596,347 A | * | 1/1997 | Robertson et al. ........... | 345/145 |
| 5,598,183 A | * | 1/1997 | Roberson et al. ............ | 345/145 |
| 5,600,779 A | * | 2/1997 | Palmer et al. ............... | 345/340 |
| 5,635,954 A | * | 6/1997 | Yamada ...................... | 345/157 |
| 5,657,050 A | * | 8/1997 | McCambridge et al. ..... | 345/145 |
| 5,701,140 A | * | 12/1997 | Rosenberg et al. .......... | 345/156 |
| 5,703,620 A | * | 12/1997 | Keyson ....................... | 345/145 |
| 5,710,574 A | * | 1/1998 | Jaaskelainen, Jr. ........... | 345/145 |
| 5,757,358 A | * | 5/1998 | Osga ........................... | 345/146 |
| 5,757,361 A | * | 5/1998 | Hirshik ....................... | 345/156 |
| 5,757,368 A | * | 5/1998 | Gergheide et al. ........... | 345/339 |
| 5,808,601 A | * | 9/1998 | Leah et al. .................. | 345/145 |
| 5,808,604 A | * | 9/1998 | Robin ......................... | 345/146 |
| 5,874,943 A | * | 2/1999 | Fitzpatrick .................. | 345/145 |
| 5,929,840 A | * | 7/1999 | Brewer et al. ............... | 345/145 |
| 5,990,862 A | * | 11/1999 | Lewis ......................... | 345/145 |
| 6,014,142 A | * | 1/2000 | LaHood ...................... | 345/145 |
| 6,061,004 A | * | 5/2000 | Rosenberg ................... | 345/145 |

FOREIGN PATENT DOCUMENTS

JP             63305422          12/1988

OTHER PUBLICATIONS

U.S. Appl. No. 08/357,678 filed Dec. 16, 1994 entitled "Ergonomic Viewable Object Processor".

* cited by examiner

*Primary Examiner*—Chanh Nguyen
*Assistant Examiner*—Paul A. Bell
(74) *Attorney, Agent, or Firm*—Joan Pennington

(57) ABSTRACT

Methods and apparatus are provided for controlling pointer movement on a user interface display screen in a computer system. Selected areas of a display screen are defined to provide predetermined pointer movement control actions. Visual cues to the selected areas are provided for the user. In accordance with a feature of the invention, the pointer movement control actions assist computer users in selecting desired operations or objects while minimizing potential for inadvertent user selections or mistakes.

12 Claims, 3 Drawing Sheets

METHOD AND APPARATUS TO CONDITIONALLY CONSTRAIN POINTER MOVEMENT ON A COMPUTER DISPLAY USING VISUAL CUES, CONTROLLED POINTER SPEED AND BARRIERS ON THE DISPLAY WHICH STOP OR RESTRICT POINTER MOVEMENT

FIELD OF THE INVENTION

The present invention relates to a computer or data processing system, and more particularly, to methods and apparatus for controlling pointer movement on a user display interface in a computer system.

DESCRIPTION OF THE PRIOR ART

A mouse and other pointing devices make it possible to quickly point at and select items on a computer display screen. A limitation in the use of these devices is that the display area is treated as a single flat space. Pointing devices traverse the entire space at either a constant or accelerated speed. While this is acceptable for a wide variety of situations, there are also circumstances where it is less convenient, sometimes frustrating, or can possibly cause disastrous results.

For example, consider the minimize, maximize, and close/exit boxes on most title bars of the windows in the Microsoft Windows 95 operating system. It is common to move the mouse to either the minimize or maximize box and click, in order to achieve those actions. Doing so often makes users confident and encourages them to do these actions with some speed. Many other similar actions train users to move the pointer quickly and press the selection button automatically. Unfortunately in this example, lurking just beyond where one would slide the pointer and click automatically for those benign actions is the close/exit box which is neither benign nor forgiving. It immediately closes the window, ending whatever task was being performed. While a small amount of additional space is provided before the exit box, much more space could have been provided in order to minimize this kind of problem. However, often there is just not enough space to prevent these kinds of problems. For example, consider a crowded instrument panel type of user interface display screen.

A need exists to reduce or prevent the travel of a mouse pointer or pointer from other pointing devices onto specified areas of the display screen.

SUMMARY OF THE INVENTION

A principal object of the present invention is to provide improved methods and apparatus for controlling pointer movement on a user display interface in a computer system. Other important objects of the present invention are to provide such improved methods and apparatus substantially without negative effects and that overcome many disadvantages of prior art arrangements.

In brief, methods and apparatus are provided for controlling pointer movement on a user interface display screen in a computer system. Selected areas of a display screen are defined to provide predetermined pointer movement control actions. Visual cues to the selected areas are provided for the user.

In accordance with a feature of the invention, the pointer movement control actions assist computer users in selecting desired operations while minimizing potential for inadvertent user selections or mistakes.

BRIEF DESCRIPTION OF THE DRAWING

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
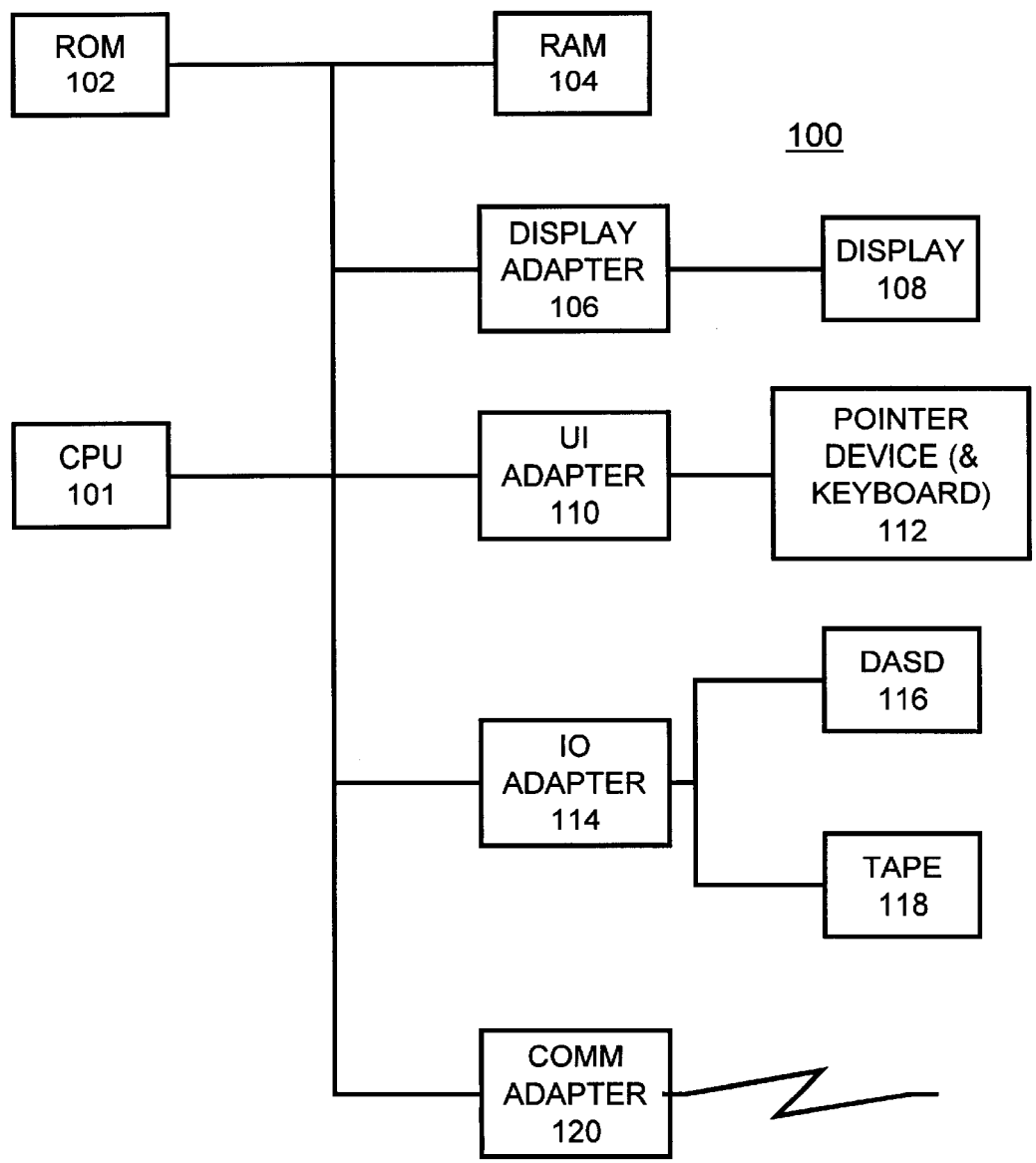
FIG. 1 is a block diagram representation of a computer or data processing system of the preferred embodiment.

Having reference now to the drawings, in FIG. 1 there is shown a computer or data processing system of the preferred embodiment generally designated by the reference character 100. As shown in FIG. 1, computer system 100 includes a central processor unit (CPU) 101, a read only memory 102, a random access memory 104, a display adapter 106 coupled to a display 108. CPU 101 is connected to a user interface (UI) adapter 110 connected to a pointer device and keyboard 112. CPU 101 is connected to an input/output (IO) adapter 114 connected to a direct access storage device (DASD) 116 and a tape unit 118. CPU 101 is connected to a communications adapter 120 providing a communications function.

Various commercially available processors could be used for computer system 100, for example, an IBM personal computer or similar workstation can be used. Central processor unit 101 is suitably programmed to execute the flowchart of FIG. 2 and to generate the barrier screen area of FIG. 3A of the preferred embodiment.

Figure 2:
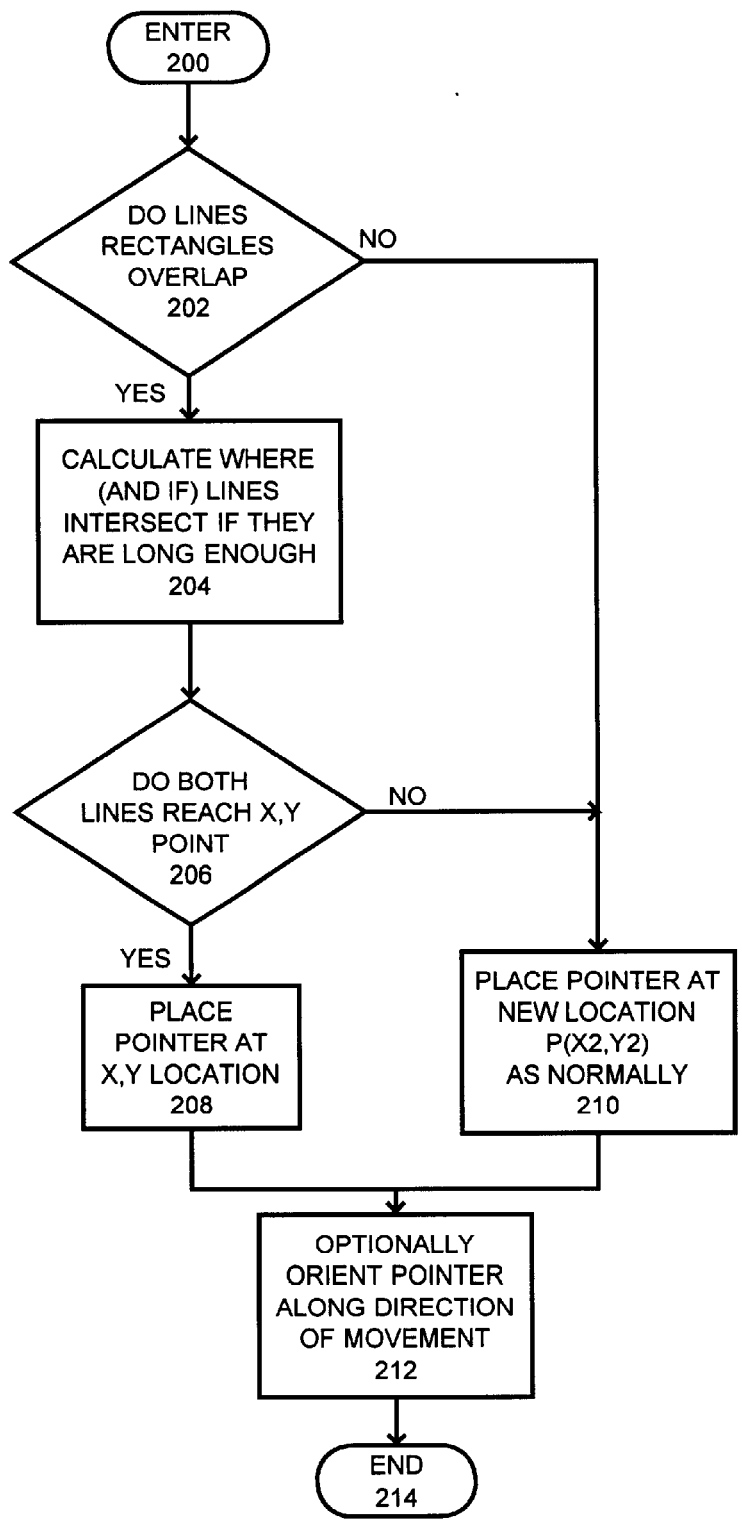
FIG. 2 is a logic flow diagram illustrating the method and apparatus of the preferred embodiment.
Figure 3A:
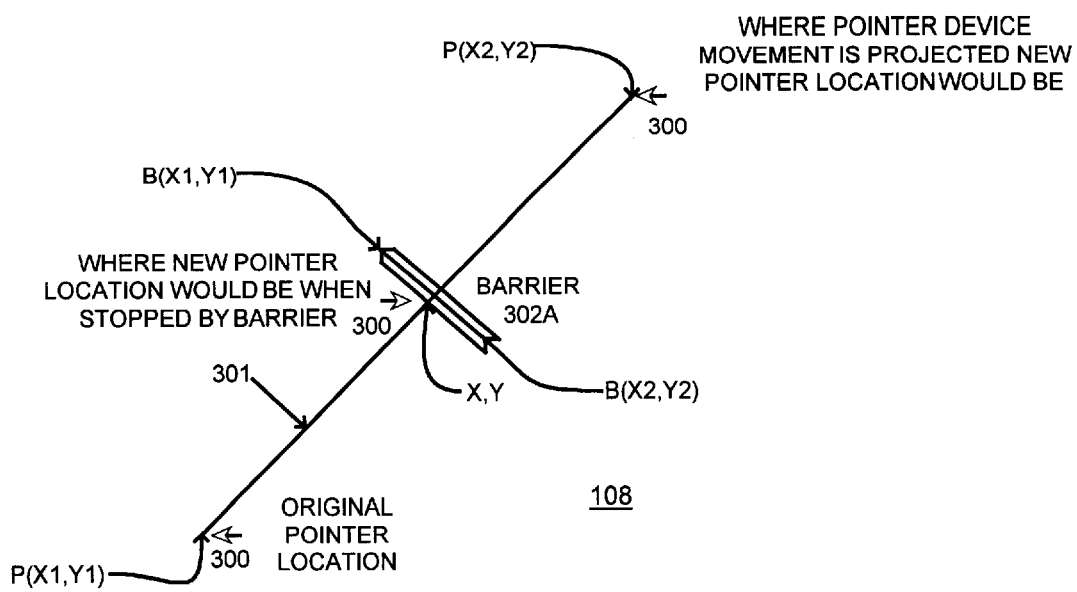
FIG. 3A is a diagram illustrating a portion of a display of the system of FIG. 1 including a barrier of the preferred embodiment.

Referring now to FIGS. 2 and 3A, methods and apparatus for controlling movement of a pointer 300 on a user display screen 108 in the computer system 100 are illustrated. As shown in FIG. 3A, an original pointer location is represented by a P(X1,Y1) with a pointer movement line 301 and a projected new pointer location is represented by a P(X2,Y2). As illustrated in FIG. 3A, selected areas, represented by a barrier 302A of the display screen 108 are defined to provide predetermined pointer movement control actions. Barrier 302A is a screen space defined by line coordinates B(X1, Y1), and B(X2,Y2). The barrier 302A can be defined as any other screen element when the user interface 108 is defined, and hidden, if desired. Or a new property of any screen element can be defined as the barrier property, also specified at screen element definition time, (and programmatically manipulatable at run time to react to dynamic conditions). At barrier 302A, the pointer 300 changes speed, such as slows down, or stops so that screen space beyond barrier 302A cannot be entered from the direction of approach through the barrier 302A.

Screen elements defining barrier 302A on the user interface display screen 108 would normally provide visual cues to the barrier areas, such as with a raised looking line or outline. Also, when a barrier area 302A is defined as a stop, the pointer shape can be changed to a stop sign or similar visual signal to reinforce the static cue. For games, more subtle cues could be used to increase the skill needed a particular game.

In FIG. 2, exemplary sequential steps for pointer movement control performed by the central processor unit 101 begin as indicated at a block 200. A preliminary check of whether the pointer movement line 301 and barrier line 302A can possibly overlap is performed as indicated at a decision block 202. This is a short cut to save processing time for the majority of pointer movements. Step 202 can be determined in parallel with step 204 where calculating where the lines intersect if they are long enough is performed. Checking whether the pointer movement line 301 and barrier line 302A actually; intersect is performed as indicated at a decision block 206. If it is determined at decision block 206 that both lines do reach the X,Y point, then the pointer 300 is placed at the location X,Y at the barrier 302A as indicated at a block 208. If determined at decision block 202 that the pointer movement line 301 and barrier line 302A do not overlap or that both lines do not reach the X,Y point at decision-block 206, then the pointer 300 is placed at the projected new location P(X2,Y2) as normally done as indicated at a block 210.

Next the pointer 300 is optionally oriented along the direction of movement as indicated at a block 212.

This technique can be used to effectively exaggerate the spacing between screen elements, or prevent pointing at an element unless entered only through one direction, such as through a door rather than just coasting onto it from any direction. This completes the sequential steps as indicated at a block 214.

Figure 3B:
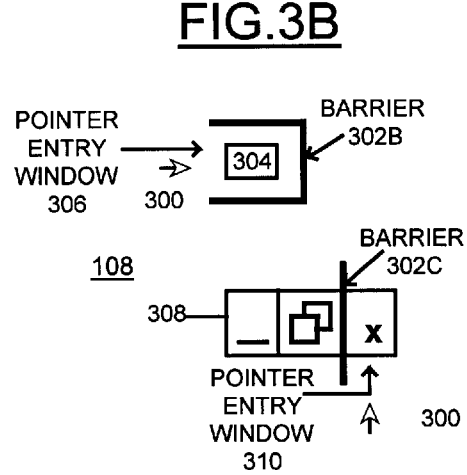
FIG. 3B is a diagram illustrating a portion of a display of the system of FIG. 1 including exemplary barriers of the preferred embodiment.

Referring now to FIG. 3B, exemplary barriers of the preferred embodiment generally designated by the reference character 302B and 302C are illustrated. Barrier 302B surrounds three sides of a predefined screen element 304. Barrier 302B can be used as a stop for the pointer 300 so that access to the screen element 304 is limited to a pointer entry window or door 306. Barrier 302C effectively isolates an exit box labeled X of a predefined screen title bar 308 from minimize and maximize boxes of the title bar 308. Access to the exit box X of title bar 308 is limited to a pointer entry window 310 from below the exit box X.

Figure 4:
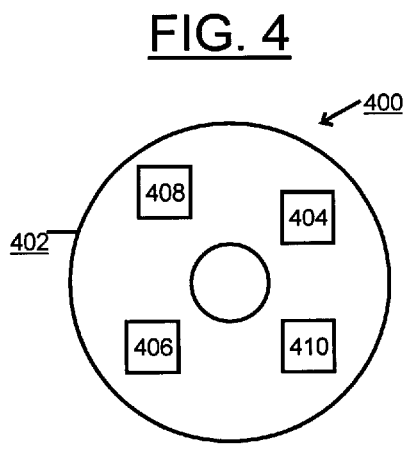
FIG. 4 is a block diagram illustrating a computer program product in accordance with the preferred embodiment.

Referring now to FIG. 4, an article of manufacture or a computer program product 400 of the invention is illustrated. The computer program product 400 includes a recording medium 402, such as, a floppy disk, a high capacity read only memory in the form of an optically read compact disk or CD-ROM, a tape, a transmission type media such as a digital or analog communications link, or a similar computer program product. Recording medium 402 stores program means 404, 406, 408, 410 on the medium 402 for carrying out the methods of the preferred embodiment in the system 100 of FIG. 1.

A sequence of program instructions or a logical assembly of one or more interrelated modules defined by the recorded program means 404, 406, 408, 410, direct the computer system 100 for implementing pointer movement control of the preferred embodiment.

While the present invention has been described with reference to the details of the embodiments of the invention shown in the drawing, these details are not intended to limit the scope of the invention as claimed in the appended claims.

What is claimed is:

1. A computer-implemented method for controlling pointer movement on a user interface display screen in a computer system comprising the steps of:

defining a selected area of the user interface display screen as a barrier;

identifying a pointer movement line;

comparing said pointer movement line with said barrier;

providing predetermined pointer movement control actions responsive to said compared pointer movement line with said barrier including the steps of changing a speed of pointer movement responsive to said compared pointer movement line with said barrier; and changing an orientation of the pointer responsive to said compared pointer movement line with said barrier.

2. A computer-implemented method for controlling pointer movement on a user interface display screen as recited in claim 1 wherein said step of defining said selected area of the user interface display screen as said barrier includes the step of identifying display screen coordinate values for said barrier.

3. A computer-implemented method for controlling pointer movement on a user interface display screen as recited in claim 1 further includes the step of providing visual cues of said defined selected area of the user interface display screen as said barrier for a computer user.

4. A computer-implemented method for controlling pointer movement on a user interface display screen as recited in claim 1 wherein said step of providing predetermined pointer movement control actions responsive to said compared pointer movement line with said barrier includes the step of stopping pointer movement at a pointer location relative to said barrier.

5. A computer-implemented method for controlling pointer movement on a user interface display screen as recited in claim 1 wherein said step of defining said selected area of the user interface display screen as said barrier includes the step of defining a predetermined screen element barrier property simultaneously with defining any screen element of the user interface display screen.

6. Apparatus for controlling pointer movement on a user interface display screen in a computer system comprising:

means for defining a selected area of the user interface display screen as a barrier;

means for identifying a pointer movement line;

means for comparing said pointer movement line and said barrier;

means for providing predetermined pointer movement control actions responsive to said pointer movement line and said barrier comparing means; said means for providing predetermined pointer movement control actions including means for changing a speed of pointer movement responsive to said pointer movement line and said barrier comparing means; and means for changing an orientation of the pointer responsive to said pointer movement line and said barrier comparing means.

7. Apparatus for controlling pointer movement on a user interface display screen as recited in claim 6 wherein said means for defining said selected area of the user interface display screen as said barrier includes means for defining a predetermined screen element property simultaneously with defining any screen element of the user interface display screen.

8. Apparatus for controlling pointer movement on a a user interface display screen as recited in claim 7 further includes means for manipulating said defined predetermined screen element property to provide visual cues of said defined selected area of the user interface display screen as said barrier for a computer user.

9. Apparatus for controlling pointer movement on a user interface display screen as recited in claim 6 wherein said means for providing predetermined pointer movement control actions responsive to said pointer movement line and said barrier comparing means includes means for stopping pointer movement at a pointer location relative to said barrier.

10. Apparatus for controlling pointer movement on a user interface display screen as recited in claim 6 wherein said means for defining said selected area of the user interface display screen as said barrier includes means for identifying display screen coordinate values for said barrier.

11. A computer program product for use in a computer system having a central processor for controlling pointer movement on a user interface display screen, the computer program product comprising:

a recording medium;

means, recorded on the recording medium, for defining a selected area of the user interface display screen as a barrier;

means, recorded on the recording medium, for identifying a pointer movement line;

means, recorded on the recording medium, for comparing said pointer movement line with said barrier;

means, recorded on the recording medium, for providing predetermined pointer movement control actions responsive to said compared pointer movement line with said barrier; said means, recorded on the recording medium, for providing predetermined pointer movement control actions including means, recorded on the recording medium, for changing a speed of pointer movement responsive to said pointer movement line and said barrier comparing means; and means, recorded on the recording medium, for changing an orientation of the pointer responsive to said pointer movement line and said barrier comparing means.

12. A computer program product for use in a computer system having a central processor for controlling pointer movement on a user interface display screen as recited in claim 11 wherein said predetermined pointer movement control actions further include stopping pointer movement at a pointer location relative to said barrier.

\* \* \* \* \*